United States Patent
Kong et al.

(10) Patent No.: US 7,472,007 B2
(45) Date of Patent: Dec. 30, 2008

(54) METHOD OF CLASSIFYING VEHICLE OCCUPANTS

(75) Inventors: Hongzhi Kong, Shanghai (CN); Qin Sun, Kokomo, IN (US); David L. Eiche, Noblesville, IN (US); Victor M. Nieto, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 474 days.

(21) Appl. No.: 11/219,233

(22) Filed: Sep. 2, 2005

(65) Prior Publication Data
US 2007/0055428 A1   Mar. 8, 2007

(51) Int. Cl.
*B60R 21/015* (2006.01)
(52) U.S. Cl. .................. 701/45; 280/734; 382/159
(58) Field of Classification Search ........... None
See application file for complete search history.

(56) References Cited

U.S. PATENT DOCUMENTS

| 5,983,147 | A | 11/1999 | Krumm |
| 6,801,662 | B1* | 10/2004 | Owechko et al. ....... 382/224 |
| 2004/0045758 | A1* | 3/2004 | Breed et al. ............ 180/271 |
| 2004/0220705 | A1* | 11/2004 | Basir et al. ............... 701/1 |
| 2005/0046584 | A1 | 3/2005 | Breed |
| 2005/0185846 | A1* | 8/2005 | Luo et al. ............... 382/224 |

FOREIGN PATENT DOCUMENTS

| DE | 19947062 | 4/2000 |
| EP | 0885782 | 12/1998 |
| WO | 0230717 | 4/2002 |

\* cited by examiner

*Primary Examiner*—Michael J. Zanelli
(74) *Attorney, Agent, or Firm*—Douglas D. Fekete (57) ABSTRACT

A method of classifying vehicle occupants utilizes a neural network engine having a state machine for determining if an occupant has changed preferably between an adult and adult, an adult and child, and a child and child from a pair of images. If no change has occurred, the method utilizes the prior occupant type and then decides if the occupant has changed in position. If no, the occupant is deemed static and the prior type is valid as a classification or output to preferably a vehicle restraint system. If the occupant has changed in position, a dynamic classification process is initiated by either an adult or a child dynamic classifier as dictated by the state machine. Valid dynamic classifier outputs or classifications can be sent to the restraint system and invalid dynamic classifier outputs are sent to a static classifier for update of the occupant type.

16 Claims, 6 Drawing Sheets

| | EMPTY | CHILD NP | CHILD OOP | TOTAL |
|---|---|---|---|---|
| TRAINING SET | 1229 | 1408 | 986 | 3623 |
| TESTING SET | 472 | 570 | 383 | 1425 |

Figure 9

| | EMPTY | ADULT NP | ADULT OOP | TOTAL |
|---|---|---|---|---|
| TRAINING SET | 1229 | 7282 | 3061 | 11572 |
| TESTING SET | 472 | 2884 | 1229 | 4585 |

Figure 10

| DYNAMIC CLASSIFIER | ES ACCURACY (CORRECT/TOTAL) | NP ACCURACY (CORRECT/TOTAL) | OOP ACCURACY (CORRECT/TOTAL) |
|---|---|---|---|
| CHILD DYNAMIC CLASSIFIER | 472/472 = 100% | 559/570 = 98.1% | 379/383 = 99% |
| ADULT DYNAMIC CLASSIFIER | 471/472 = 99.8% | 2868/2884 = 99.5% | 1211/1229 = 98.5% |

Figure 11

METHOD OF CLASSIFYING VEHICLE OCCUPANTS

FIELD OF THE INVENTION

The present invention relates to a method of classifying vehicle occupants and more particularly to a method of classifying vehicle occupants and occupant position utilizing a vision-based occupant classification system.

BACKGROUND OF THE INVENTION

Automotive airbag safety and effectiveness increasingly demand an occupant sensing system that can accurately classify the occupant types and positions. There are two types of known classification processes referred as "static classification" and "dynamic classification." The static classification typically requires an update speed of a few seconds within which a change of occupant type (for example, an occupant is leaving or entering the vehicle) may occur. When a person is already present in the seat, however, dynamic classification is desirable since that position may change quickly during an accident from hard braking or impact. It is generally known that the required dynamic response time should be in the order of a few tens of milliseconds.

Depending on specific applications, an occupant in the front passenger seat may be classified into several categories such as adult, child without car seat (Child), rear-facing infant seat (RIFS), forward facing child seat (FFCS), and empty seat (ES). The function of a dynamic classifier is to further identify the relative position of a person (adult/child) within an established category. If the person is inside a predetermined at-risk zone (i.e. head and/or torso is too close to the airbag), the occupant should be identified as Out-of Position (OOP). On the other hand, if the person is outside the at-risk zone, the occupant should be identified as normal position (NP). The dynamic classifier functions are further identified in U.S. patent application Ser. No. 11/218,671, titled Vision-Based Occupant Classification Method and System for Controlling Airbag Deployment in a Vehicle Restraint System, Filed Sep. 2, 2005, (DP-313789) assigned to Delphi Technologies, Inc., and incorporated herein in it's entirety.

Challenges to achieve vision based dynamic classifications include required accuracy and speed. Complex image features and algorithms are usually needed to obtain robust and accurate classification, which at the same time, fails to meet the required speed. In some cases, occupant head/torso tracking algorithms are used for dynamic classification. A cascaded classification structure that allows a prior knowledge of the occupant type to be established through static classification would be desirable for speed considerations. A motion-detection based state machine could then be used to safeguard the status or prior classification type if no change in type has occurred so that a proper dynamic classification process can be applied. However, an effective dynamic classifier remains to be developed. Furthermore, it has been observed that the motion-detection based state machine could experience false detections under certain conditions. For example, when an occupant exits/enters the vehicle slowly, the event may not be detected (false positive). Or a false detection by the state machine may occur when an occupant moves inside the vehicle in a certain way (false negative).

SUMMARY OF THE INVENTION

A method of classifying vehicle occupants and occupant position utilizes a neural network engine having a state machine for determining if an occupant has changed preferably between an adult and adult, an adult and child, and a child and child. If no change has occurred, the method utilizes the prior occupant type and then decides if the occupant has changed in position. If no, the occupant is deemed static and the prior type is valid as a classification or output to preferably a vehicle restraint system. If the occupant has changed in position, a dynamic classification process is initiated by either an adult or a child dynamic classifier as dictated by the state machine. Valid dynamic classifier outputs or classifications can be sent to the restraint system and invalid dynamic classifier outputs are sent to a static classifier for update of the occupant type.

Preferably, the adult and child dynamic classifiers of the neural network engine utilize known wavelet features and novel differential edge density features generally calculated by the neural network engine from a pair of images taken by two respective cameras in the vehicle. Generally, when the dynamic classifier is switch on, the static classifier is switched off and vice versa to save computation time for quick classification determination. The final output or classification signal of the neural network engine is preferably sent to a restraint system for enhanced safety by disabling, for example, airbag deployment when an occupant is out of position.

BRIEF DESCRIPTION OF THE DRAWINGS

The presently preferred embodiment of the invention is disclosed in the following description and in the accompanied drawings, wherein.

DETAILED DESCRIPTION OF PREFERRED EMBODIMENTS

Figure 1:
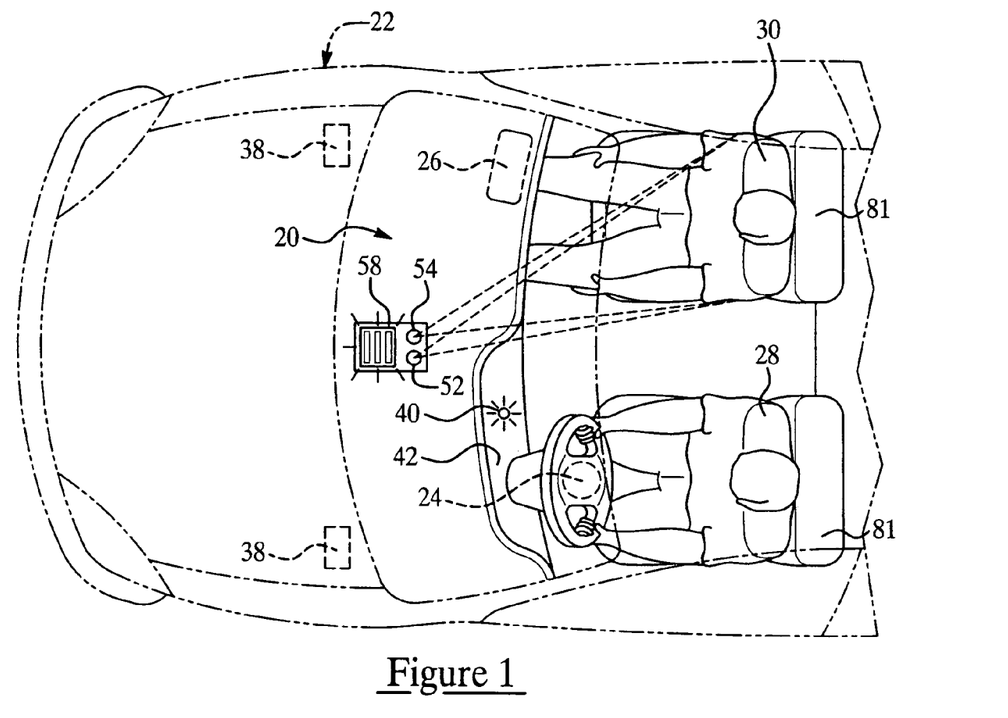
FIG. 1 is a top view of a vehicle with portions broken away to show detail of a restraint system using the classification of the present invention.
Figure 2:
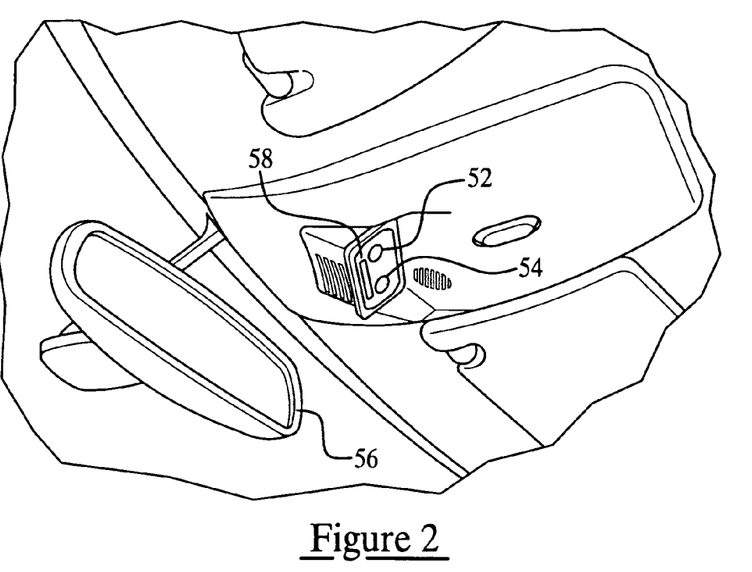
FIG. 2 is a perspective view of first and second imaging sensors of the classification system.
Figure 3:
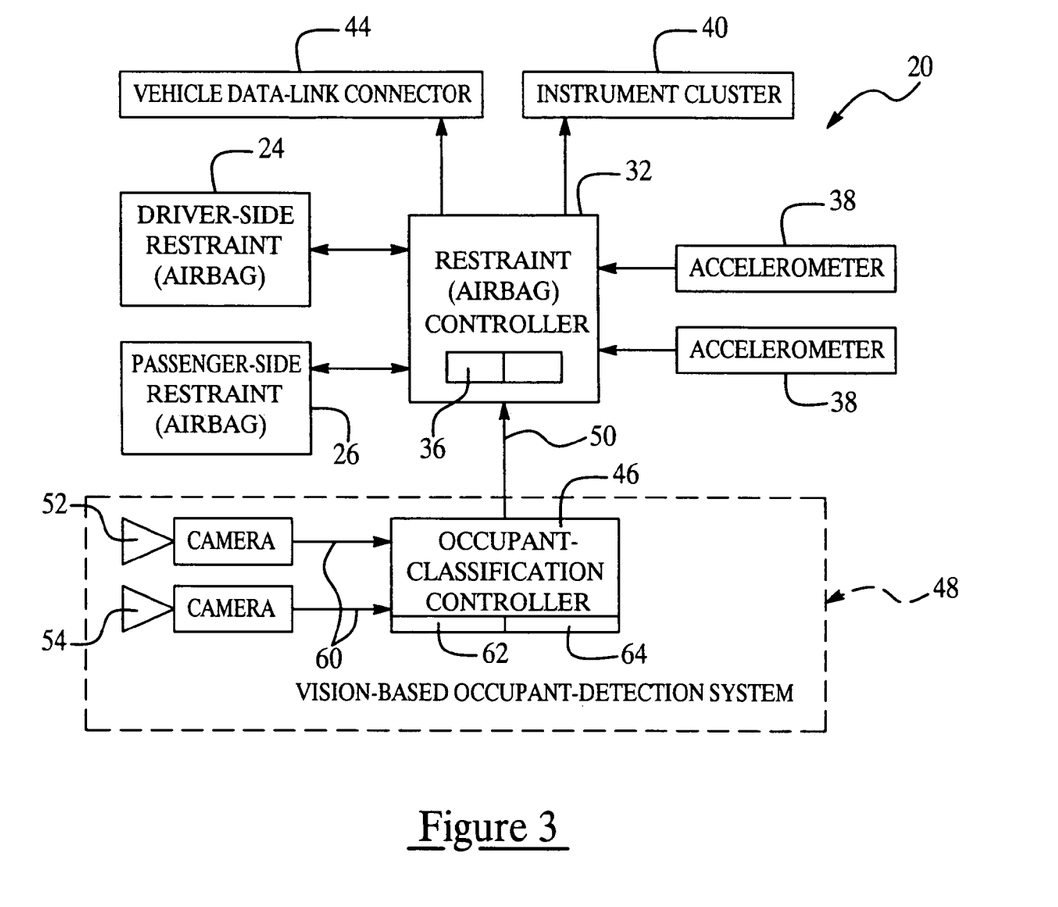
FIG. 3 is a block diagram of the restraint system shown in FIG. 1.

Referring to FIGS. 1-3, a restraint system 20 of a vehicle 22 preferably has a frontal operator airbag 24 and a frontal passenger airbag 26 along with corresponding seat belt devices known in the art. Each airbag 24, 26 preferably inflates independently during a frontal crash of the vehicle 22 to protect the occupants facing the respective airbags 24, 26. The occupants preferably include a driver 28 and a passenger 30. The restraint system 20 has a restraint controller 32 that initiates the airbag inflation by sending an electrical signal to an inflator of the restraint system 20. A microprocessor 36 controls the controller that deploys each airbag 24, 26 separately. The microprocessor 36 determines when a crash is occurring by electrical input signals received from at least one and preferably a plurality of accelerometers 38 that indicate a change in velocity with time or rapid deceleration. A large deceleration indicates that a crash is in progress. The microprocessor 36 of the restraint controller 32 has software calibrations that determine the magnitude of deceleration indicative of a crash for a particular vehicle.

The vehicle restraint controller 32 can preferably diagnose the restraint system 20. If a problem is detected by the restraint controller 32, a telltale indicator 40 on an instrument cluster 42 of the vehicle 22 can warn the driver 28 audibly and/or visually. The controller 32 can also send an electrical diagnostic signal to a remote tester that a technician can connect to a vehicle data link or serial bus 44 used for communication.

A classification controller 46 of a vision-based occupant classification system 48 of the restraint system 20 classifies the occupant 28, 30 and periodically electrically transmits its classification 50 to the vehicle restraint controller 32 preferably using a data bus. Dependent upon the input classification signal 50, the restraint controller 32 can disable the passenger-side or driver-side airbags 26, 24, preventing either from deploying even in the event of a crash. The vision-based occupant-classification system 48 also communicates with the restraint controller 32 to control the intensity of the airbag deployment, or prevent deployment altogether, depending upon a variety of pre-established parameters. The system preferably utilizes two imaging sensors 52, 54, or video cameras, to analyze the image of a person or object near an airbag for classification. Image classifications generally include: 1) rear-facing infant seat (RFIS); 2) front-facing infant seat (FFIS); 3) adult normal or twisted position (Adult NT); 4) adult out of position (Adult OOP); 5) child normal or twisted position (Child NT); 6) child out of position (Child OOP); and 7) empty seat (Empty). For instance, front-seat passenger 30 may be considered out of position if his/her head or torso is within twelve inches of the dashboard. An empty seat is not necessarily completely empty but may have inanimate objects (for example, a box or newspaper) placed upon it.

Generally, the vision-based occupant-classification device 48 disables either airbag 24, 26 for "Adult OOP" and "Child OOP" classifications and for RFIS (because the head of the infant in such a seat is near the dashboard) upon the classification input signal 50 from the classification controller 46 to the restraint controller 32. Child NT is also a case for disabling the airbag 26, while Adult NT is preferably a case for enabling the airbag 26. The airbag is preferably disabled for the FFIS classification to eliminate any possible harm to the child, and the airbag 26 is preferably disabled for an empty seat to save the cost of replacing the airbag after a crash.

The occupant-classification system 48 uses the two cameras 52, 54 to obtain "stereovision" images of the occupants 28, 30 from two different perspectives. The cameras 52, 54 are preferably mounted near a rear-view mirror 56 of the vehicle 22 and next to an illuminator 58 that transmits light at an infrared wavelength which is generally invisible to the naked eye (as best shown in FIG. 2). Because the infrared light filters out other types of light, the illumination can be kept more uniform as ambient light levels change. The cameras 52, 54 register the images as a two-dimensional matrix of digital grayscale data, meaning that they are stored in discrete shades of gray, with each data value representing the intensity of a particular point in each image. Each of these points is called a pixel. The darkest pixels have the minimum value (zero) and the brightest pixels have the maximum value. The vision-based occupant classification system 48 preferably uses eight-bit data having a maximum value of about 255. The classification controller 46 of the occupant-classification system 48 controls the system and electrically receives the stream of image data 60 from the cameras. Knowing the distance between the cameras 52, 54 and having two perspectives, the classification controller 46 is able to estimate the range or distance of objects in the images from the cameras, providing the depth of the objects in the images. This third dimension or depth perception is desirable for classifying the image.

Figure 4:
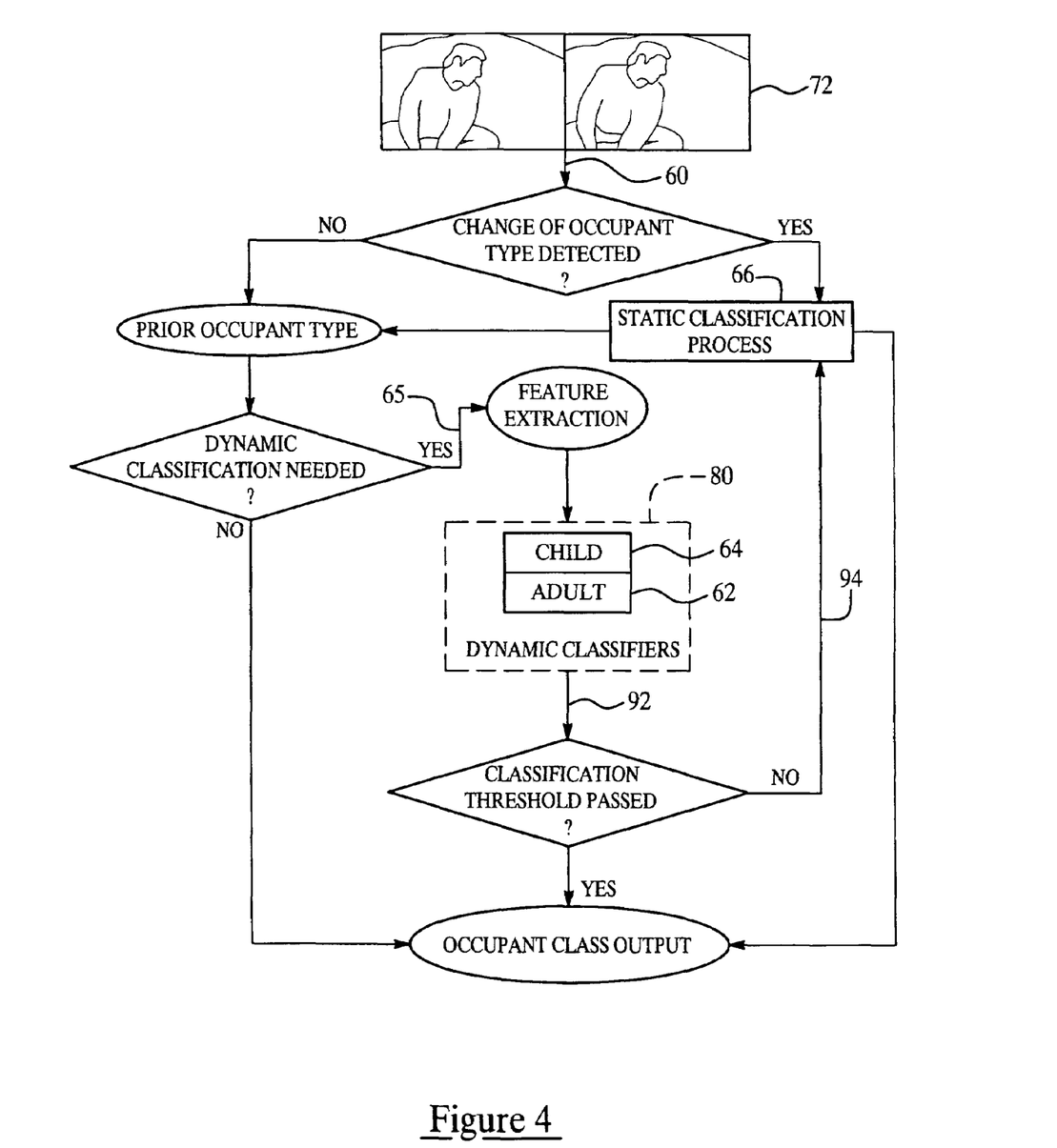
FIG. 4 is a flow chart of a method of classifying vehicle occupants and occupant position of the present invention.
Figure 7:
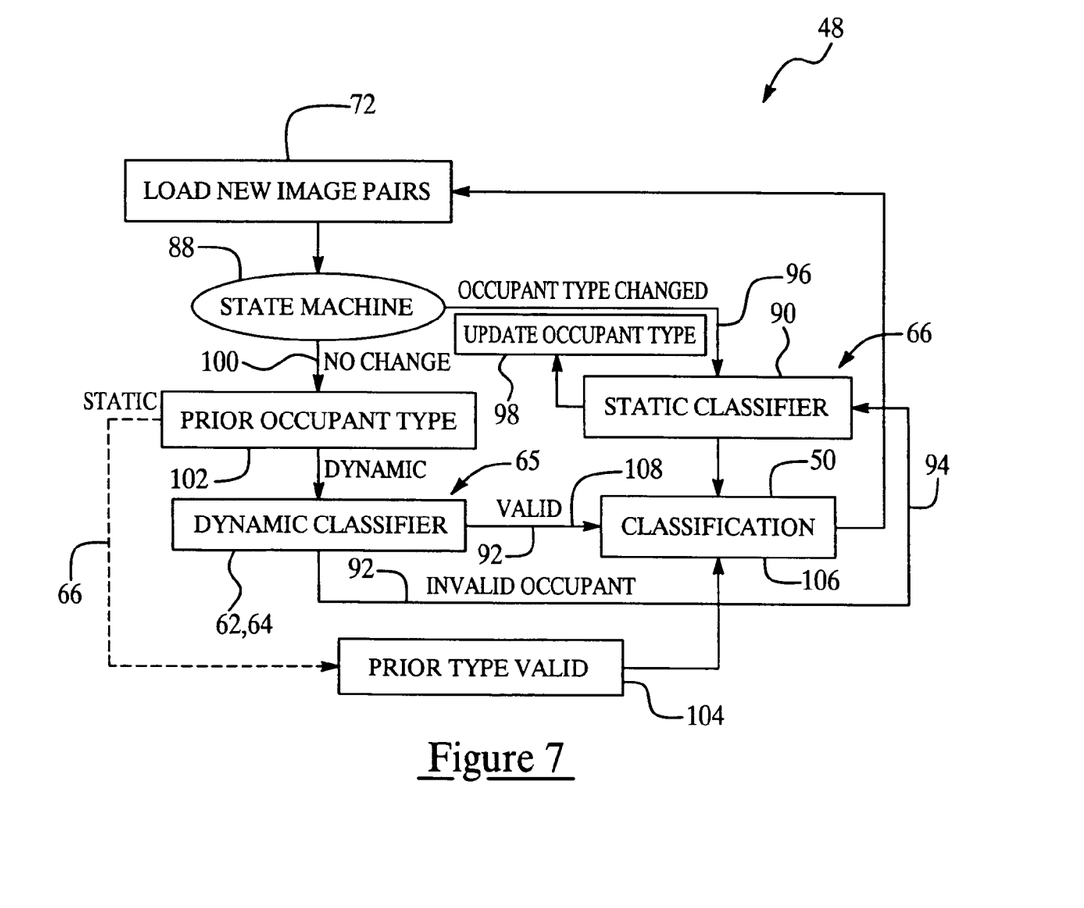
FIG. 7 is a flow chart of an OR logic of the method of classifying vehicle occupants and occupant position and utilizing the vision-based occupant classification system.
Figure 8:
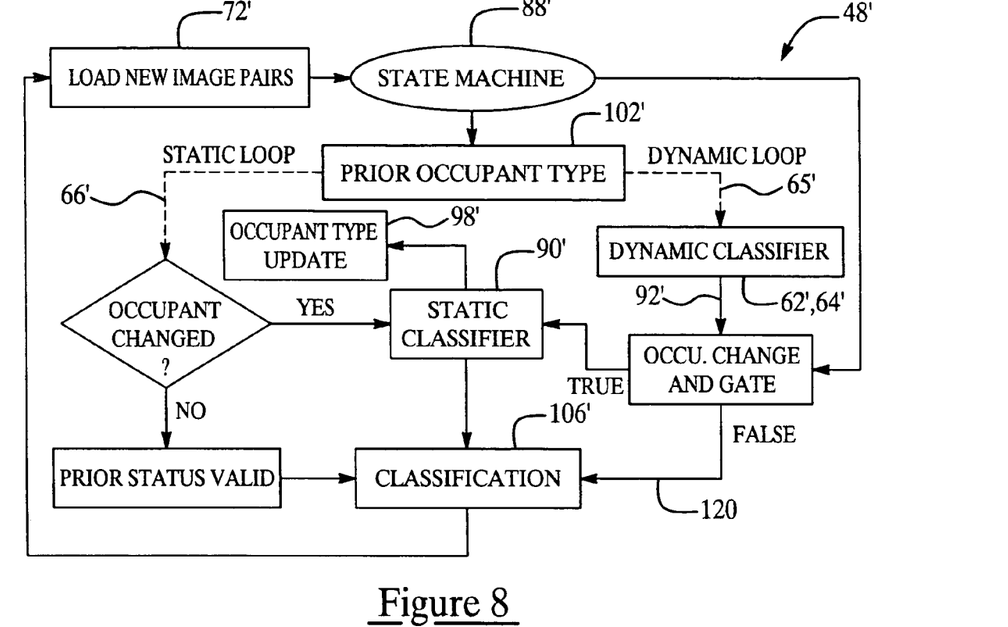
FIG. 8 is a flow chart a second embodiment similar to FIG. 6 except utilizing an AND logic of the method of classifying vehicle occupants and occupant position.

In order to achieve fast and accurate classification, two independent dynamic classifiers are constructed. One classifier 62 is dedicated for adult category that outputs two possible classes: Adult out of position (Adult_OOP) and Adult in normal position (Adult_NP). The other classifier 64 is dedicated for child category that outputs two possible classes: Child out of position (Child_OOP) and Child in normal position (Child_NP). Both of the classifiers 62, 64 are part of a neural network engine 80 having the same neural network structure and input features 68. See FIG. 6. The prior knowledge of the occupant category from a static classification process 66 is used to automatically select which of these two classifiers 62, 64 is used for a dynamic classification process 65 which is best shown in FIG. 4 and 7-8. This approach minimizes the possible confusion between adult and child classes and therefore increases the dynamic classification process 65 accuracy.

Figure 5:
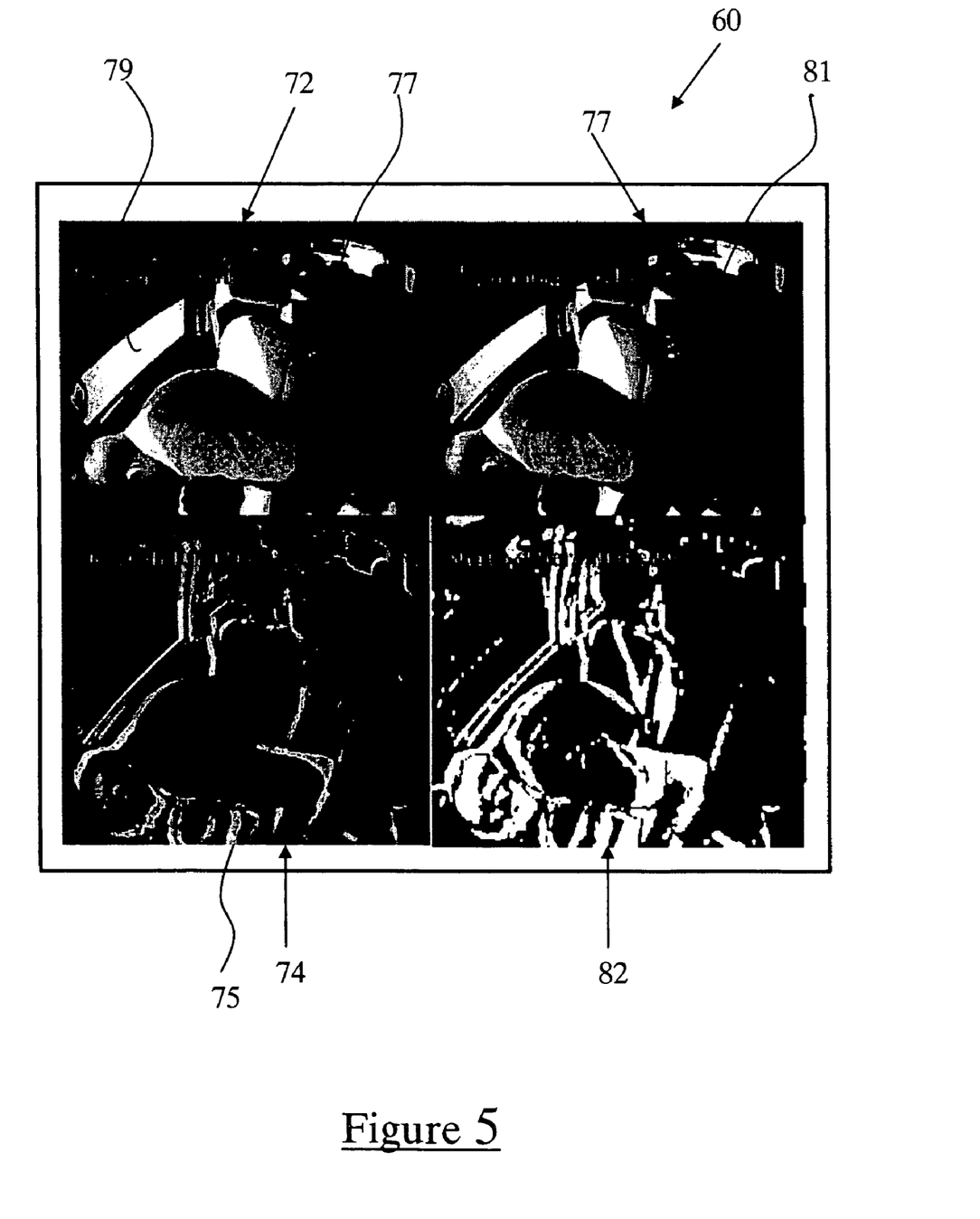
FIG. 5 is a comparison pictorial of image pairs processed into a stereo differential image and then into a binary image utilizing in-part the method of classifying vehicle occupants and occupant position.

Another key consideration for the adult and child dynamic classifiers 62, 64 is to use simple but informative image features 68 to achieve the required accuracy and speed. In order to capture the image range information without a complex disparity calculation, a novel stereo differential edge density feature 70 of the image features 68 is introduced. Referring to FIG. 5, assume $A_{i,j}$ and $B_{i,j}$ denotes a pixel location (i,j) of a stereo image pair 72 taken from cameras 52 and 54 respectively. An offset-compensated and intensity normalized stereo differential image 74 has a corresponding pixel location $C_{i,j}$ and is constructed according to:

$$C_{i,j} = \frac{|B_{i+\text{H\_offset}, j+\text{V\_offset}} - A_{i,j}|}{B_{i+\text{H\_offset}, j+\text{V\_offset}} + A_{i,j}} \times \text{Full\_Pixel\_Depth} \tag{1}$$

For a horizontal stereo configuration, H_offset is the horizontal correspondence disparity value averaged in the field of view when an object is at distance infinity. Similarly, the parameter V_offset is the averaged pixel location difference in vertical direction of a correspondence point between the stereo or paired images 72 at different object distances. These offset values can be determined though initial camera configuration calibration. The Full_Pixel_Depth is simply the maximum scale of the pixel grey level. For example, for an 8-bit pixel depth, this parameter would be 255. The offset compensation is intended to suppress far field object (background) so that the foreground object can be naturally segmented. The image intensity normalization and scaling is intended to improve the image visibility and contrast. Such a stereo differential image is essentially an edge map where the width of the edge is wider when the object is closer.

Note that the image normalization and scaling described by Equation (1) may amplify noises in the extreme dark region of the image. In order to suppress these noises, a pre-determined pixel intensity threshold referred as Threshold_A is used to construct a final stereo differential image $C'_{i,j}$ of image 74 with the following rules:

If $B_{i+H\_offset, j+V\_offset} + A_{i,j} >$ Threshold_A, then $$C'_{i,j} = \frac{|B_{i+H\_offset, j+V\_offset} - A_{i,j}|}{B_{i+H\_offset, j+V\_offset} + A_{i,j}} \times \text{Full\_Pixel\_Depth} \quad (2)$$

Otherwise, $C'_{i,j} = 0$.

The stereo differential edge densities features 70 of the image features 68 are then extracted from the final stereo differential image $C'_{i,j}$ of image 74. This extraction first converts the final stereo differential image $C'_{i,j}$ into a binary image $D_{i,j}$, or binary map 82, with a pre-determined differential intensity threshold (Threshold_B), by the following rule:

If $C'_{i,j} >$ Threshold_B then $D_{i,j} = 255$ Otherwise $D_{i,j} = 0$.

Unlike traditional edge filters such as the Sobel filter, this process produces "solid" edges from the stereo differential images 74 and reserves the thickness of the edges. The thickness contains wanted range information of the object.

Secondly, the extraction then applies morphological operations on the binary map to remove smaller particles generally denoting noise. Preferably, one erosion process followed by one dilation process is applied to the binary map to achieve a refined binary map of the binary map 82.

Lastly, to gain the stereo differential edge density feature or map 70, the resultant binary image 82 is divided into a number of bins or density areas of a predetermined region of interest (ROI). The total number of non-zero pixels in each bin is then counted as an image input feature. The differential edge density feature 70 is a matrix of all the bins and is fed into the neural network engine 80 of the controller 46 having the adult and child classifiers 62, 64.

FIG. 5 illustrates an example of the stereo differential image 74 computed from the paired images 72 by the controller 46 and illustrates the corresponding stereo differential edge or binary map 82. There are a few significant characteristics of the stereo differential edge density features 70 that can benefit the adult and child dynamic classifiers 62, 64. First of all, the occupant (i.e. driver 28 or passenger 30) range information is registered. The location shift of a correspondent image point between the stereo image pairs 72 is strongly dependent on the object distance. This is evident in FIG. 5 as the "edges" of the occupant is thicker in the near field and thinner in the far field. In fact, it is this shift that creates the non-zero values in the stereo differential image 74. At the same time, the stereo differential edge map 82 suppresses background (far field) automatically (compared to the stereo differential image 74. The stereo differential images 74 produce object outlines 75 (contours) while ignoring details (smeared image). Because the offset compensated disparity values approach zero in the far field 77, the stereo differential edge image 82 has far less noise outside the vehicle door window 79 or behind the front seats 81 than the stereo differential image 74. As indicated by Equation (2), the stereo differential image 74 is invariant to the absolute global lighting intensities. This can increase the vision-based occupant classification system 48 immunity to lighting environment changes. The intensity normalization produces improved image contrast and boosts the dim region in the raw image (as seen in the head area of FIG. 5). Finally and importantly for the dynamic classification process 65, it is simple and fast to be processed.

As an example of extracting proper image features 68, stereo differential image 74 with about 320×240 resolution and about 120° field of view is first converted into the binary image 82. After applying morphological operations as previously described, the resultant edge image of the binary image 82 is divided into preferably about 12×10=120 bins in an area of preferably about 180×224 ROI. The number of edge pixels in each bin is then associated with the bin as an edge density feature point of the features 70.

Figure 6:
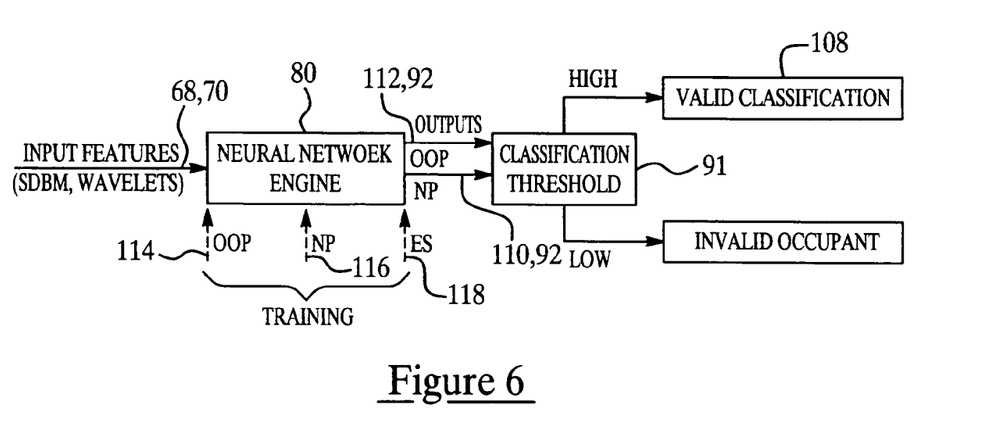
FIG. 6 is a flow chart depicting a portion of the method of classifying vehicle occupants and occupant position and utilizing a vision-based occupant classification system.

Referring to FIG. 6, in order to improve the classification accuracy, known image wavelet features of the input features 68 are combined with the stereo differential edge features 70 as the neural network input. The known wavelet transform is performed on one of the image pairs 72 with preferably about 32×32 and 64×64 known Haar base functions in both the horizontal and vertical directions on a preferably about 192×222 image ROI. A total of about twenty-two wavelet features are produced as part of the input features 68 to the neural network engine 80. Therefore, there are preferably about 342 image features as the input 68 of the neural network (342-node input layer) engine 80.

More specific to the present invention, as an example of neural network implementation, a fully connected back-propagation neural network with two hidden layers is developed. The first hidden layer has about ninety nodes and the second has about forty five nodes. The output layer is consisted of two nodes that are associated with the Adult_/Child_OOP and Adult_/Child_NP, respectively. For the purpose of providing a state machine or arming functions 88 to be described in detail later, the dynamic classifiers 62, 64 of the neural network engine 80 was trained with three input occupant categories: OOP, NP, and empty seat (ES). Although the dynamic classifiers 62, 64 each have only two possible outputs (OOP or NP), the idea is to use the ES training set to force a low confidence vote at the outputs when a valid occupant is not present.

In conjunction with the static classification process 66 and the occupant category change detection or state machine 88, either the adult dynamic classifier 62 or the child dynamic classifier 64 will be switched on after a proper occupant category has been established (and a static classifier 90 will be off) and remain operational as long as the state machine 88 has not detected a change of that category thereafter. However, if the state machine 88 produces positive or negative false detections (a change of occupant category occurred but not detected or a change of occupant category did not occur but falsely detected), the dynamic classification process 65 can be wrongly switched off or produces false classification. In order to counter this problem, the confidence level of the dynamic classifiers 62, 64 is used as a detection of category changes. This level of confidence is proportional to the value of classifier's output 92 and can be normalized to range between zero and one (see FIGS. 4 and 6). By setting a predetermined confidence or classification threshold 91, a confidence below the threshold 91 from the dynamic classifier 62, 64 would indicate an invalid dynamic classification 94 as a result of occupant category change.

The capability of detecting a change of occupant category by the dynamic classifier 62, 64 or neural network engine 80 of the occupant classification controller 46 can be used as a state machine 88 by itself. Alternatively, the arming function of the dynamic classifier can be combined with an existing state machine in OR logic (see FIG. 7) or AND logic (see FIG. 8) ways (i.e. first and second embodiments). The neural network engine 80 detects the change and thus reduces the possibility of false negative detection of the occupant classification system 48. The OR structure would catch an occupant category change event if either the state machine .88 or the dynamic classifier 62, 64 detect the change, reducing the possible false positive detection of the system 48.

Referring more generally to FIG. 7, the state machine 88 detects possible changes of occupant types from analyzing the stream of stereo image pairs 72. If a change is detected 96, the system 48 will go through the static classification process 66 wherein a new occupant category 98 can be established and updated. If no change of occupant type is detected 100, the system 48 will go through the dynamic classification process 65 with a prior knowledge of the established occupant type 102. If the prior occupant type 102 does not require dynamic classification (not a child or adult category), then the previously established occupant type stays valid 104 as current classification 106. However, if the prior occupant type 102 is a child or adult, proper image features 68 will be extracted from the current image pair 72 and fed into the proper dynamic classifier 62 or 64. If the output confidence of the dynamic classifier is higher than a pre-determined confidence threshold 91, the system will consider the classification valid 108. This system has been successfully demonstrated in a proper environment. The classification accuracy of the neural network engine 80 achieved 98.1% (Child_NP), 99.0% (Child_OOP), 99.5% (Adult_NP), and 98.5% (Adult_OOP). The dynamic classification speed with a Pentium3 PC reached ten milli-seconds. At the same time, the neural network engine 80 is capable of 99.9% detection of the change of occupant type.

Figure 9:
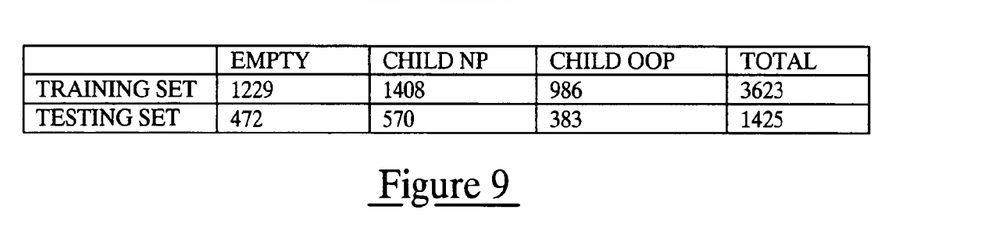
FIG. 9 is a table recording the number of training and testing data for a child dynamic classifier of a neural network engine.
Figure 10:
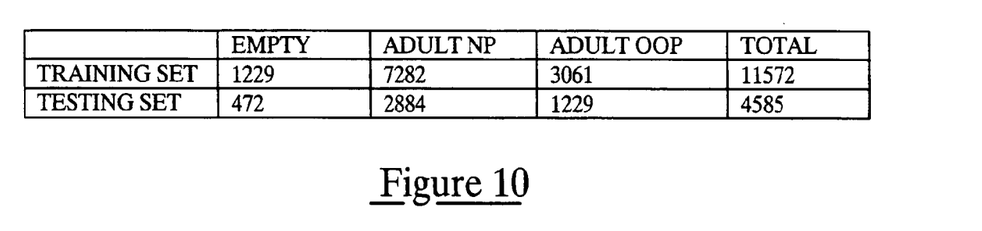
FIG. 10 is a table recording the number of training and testing data for an adult dynamic classifier of the neural network engine.

For each dynamic classification (child and adult), the stereo differential edge density features 70 and wavelet feature are used as the input 68 to the neural network engine 80. Both classifiers 62, 64 of the engine 80 are trained with the same training and testing data sets. The data in the training set and the testing set are exclusive. Both data sets contain real-world vehicle environment, lighting conditions, occupant size and position. FIG. 9 shows a preferred number of training data and testing data for the child dynamic classifier 64 while FIG. 10 shows a preferred number of training data and testing data for the adult dynamic classifier 62.

Referring to FIG. 8, an alternative to the OR logic system 48 is illustrated. Contrary to system 48, this occupant categorizing system 48' uses an AND logic to achieve a classification output 106'. System 48' has adult and child dynamic classifiers 62', 64', a static classifier 90' and a state machine 88' performing similar functions as those applied in system 48 with like numbers. However, unlike system 48, system 48' has a fixed false negative operation wherein a false occupant change 120 is generally ignored and the prior classification output 106' is applied, and a true occupant change 94' is applied to the static classifier 90'. In contrast, system 48 has a fixed false positive operation wherein an invalid occupant signal 94' (low confidence) is sent to the static classifier 90 and a valid occupant signal 108 (high confidence) is utilized as the classification output 50, 106.

Figure 11:
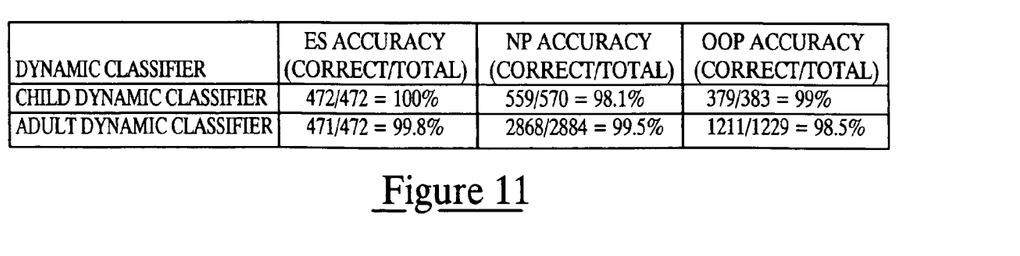
FIG. 11 is a table recording the performance of the neural network engine in regards to empty seat accuracy, occupant in normal position accuracy, and occupant out of position accuracy.

Referring to FIG. 6, the neural network engine 80 has two outputs: adult/child NP 110 and adult/child OOP 112. In order to utilize the neural network engine 80 as an arming function or state machine 88 to detect possible changes of occupant categories the engine was trained with three corresponding occupant categories: OOP 114, NP 116, and ES 118. As classification threshold 91 is set for the same purpose. Assume $C_{NP}$ and $C_{OOP}$ are the two outputs of the engine 80. The classification is made according to the following rules:

If $C_{NP}$<classification threshold AND $C_{OOP}$<classification threshold Then Classification is ES If $C_{NP}$>$C_{OOP}$ AND $C_{NP}$>classification threshold Then Classification is NT If $C_{OOP}$>$C_{NP}$ AND $C_{OOP}$>classification threshold Then Classification is OOP FIG. 11 shows the performance of the neural network engine 80 that displays the ES accuracy, which is necessary for the arming function 88. The ES accuracy reaches 100% AND 99.8% in child dynamic classification and adult dynamic classification respectively. The average ES accuracy is 99.9%, which means 99.9% of the occupant changes can be detected by the engine 80. The classification accuracy of Child_NP, Child_OOP, Adult_NP and Adult_OOP achieves 98.1%, 99.0%, 99.5% respectively. This data shows that the proposed differential edge density features 70, the strategy that use three categories data (ES, NP, OOP) to train the two output (NP, OOP) neural network engine 80 and the novel classification rules described above, enable the dynamic classifiers 62, 64 to satisfy both speed and accuracy requirements.

Although the preferred embodiments of the present invention have been disclosed, various changes and modifications can be made by one skilled in the art without departing from the scope and spirit of the invention as set forth in the appended claims. Furthermore, it is understood that the terms used here are merely descriptive rather than limiting and various changes may be made without departing from the scope and spirit of the invention.

We claim:

1. A method at classifying vehicle occupants comprising the steps of:

generating a stereo image pair of occupant from two cameras;

inputting the image pair into an occupant classification controller;

processing the stereo image pair into a differential edge density feature by the controller;

inputting the differential edge density feature into a state machine of the controller;

determining, by the state machine and using the differential edge density feature, if the occupant has changed with regard to occupant type;

if the occupant has changed with regard to occupant type, applying a static classification process having a prior knowledge of the occupant type in memory of the controller;

determining if prior occupant type has changed by the state machine between an adult and a child;

establishing whether the occupant is an adult or a child;

switching on a corresponding adult or child dynamic classifier of the controller;

switching off a static classifier of the static classification process; and utilizing the differential edge density features by the corresponding adult or child dynamic classifier to determine an occupant class output which signifies occupant position.

2. The method of classifying vehicle occupants set forth in claim 1 wherein the occupant class output is outputted from a neural network engine having the adult and child dynamic classifiers, and is inputted into a restraint controller of a restraint system.

3. The method of classifying vehicle occupants set forth in claim 2 comprising the further steps of:

disarming the restraint system by the classification controller if the occupant class output signifies occupant is out of position; and not disarming the restraint system by the classification controller if the occupant class output signifies occupant is in a normal position.

4. The method of classifying vehicle occupants set forth in claim 1 comprising the further step of combining wavelet features with the differential edge density features as an input into the adult and child dynamic classifiers to determine the occupant class output.

5. The method of classifying vehicle occupants set forth in claim 4 wherein the occupant class output is either out of position or normal position.

6. The method of classifying vehicle occupants set forth in claim 4 comprising the further step of applying a classification threshold to the occupant class output to determine validity of the output.

7. The method of classifying vehicle occupants set forth in claim 6 comprising the further step of training the adult and child classifiers with three prescribed input occupant categories signifying occupant out of position, occupant in normal position and empty seat.

8. The method of classifying vehicle occupants set forth in claim 7 comprising the further steps of:

forcing a low confidence value for invalidity of the output by the prescribed input occupant category signifying empty seat if an empty seat is present;

switching on the static classifier for receipt of the low confidence output; and updating the occupant type.

9. The method of classifying vehicle occupants set forth in claim 1 wherein the occupant change is between adult and adult, adult and child, child and child, adult and empty seat, and child and empty seat.

10. The method of classifying vehicle occupants set forth in claim 1 comprising the further step of utilizing the prior occupant type if the occupant has not changed, as detected by the state machine.

11. The method of classifying vehicle occupants set forth in claim 10 comprising the further step of outputting the prior occupant type as the classification if the occupant remains in position as indicated by the differential edge density feature and thus the dynamic classification process is not required.

12. The method of classifying vehicle occupants set forth in claim 11 comprising the further step of initializing the corresponding adult or child dynamic classifier if the occupant has not remained in position.

13. The method of classifying vehicle occupants set forth in claim 12 comprising the further steps of:

comparing the output of the adult or child dynamic classifier to a classification threshold;

recording the output as an occupant class output if the output passes the classification threshold; and recording the output as an invalid output if the output does not pass the classification threshold.

14. The method of classifying vehicle occupants set forth in claim 13 comprising the further steps of:

switching on the static classifier for receipt of the invalid output; and updating of the occupant type by the static classifier.

15. A method of classifying vehicle occupants comprising the steps of:

generating a stereo image pair of an occupant from two cameras;

determining if the occupant has changed between an adult and adult, an adult and child, and a child and child by a state machine of a neural network engine;

determining if the adult or child has altered position within the vehicle by the state machine;

if position is altered, initiating a corresponding adult or child dynamic classifier to compute a classification output; and if the position is not altered, recording a previous classification as the current classification.

16. The method of classifying vehicle occupants set forth in claim 15 comprising the further steps of:

processing the classification output through a pre-established confidence threshold to determine validity of the classification output;

if valid, releasing the classification output to a restraint system; and if invalid, sending the classification output to a static classifier for updating of an occupant type.

* * * * *